US012726052B2

(12) United States Patent
Choi et al.

(10) Patent No.: US 12,726,052 B2
(45) Date of Patent: Sep. 1, 2026

(54) WIRELESS POWER RECEPTION DEVICE, WIRELESS POWER RECEPTION METHOD, AND WIRELESS CHARGING SERVICE PROVIDING METHOD

(71) Applicant: LG ELECTRONICS INC., Seoul (KR)

(72) Inventors: Jingu Choi, Seoul (KR); Jaehyu Kim, Seoul (KR); Minsoo Lee, Seoul (KR); Jinkwon Lim, Seoul (KR); Yongcheol Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1078 days.

(21) Appl. No.: 17/758,861

(22) PCT Filed: Dec. 30, 2020

(86) PCT No.: PCT/KR2020/019409
§ 371 (c)(1),
(2) Date: Feb. 3, 2023

(87) PCT Pub. No.: WO2021/149937
PCT Pub. Date: Jul. 29, 2021

(65) Prior Publication Data

US 2023/0198318 A1 Jun. 22, 2023

(30) Foreign Application Priority Data

Jan. 20, 2020 (KR) ........................ 10-2020-0007483

(51) Int. Cl.
*H02J 50/80* (2016.01)
*H02J 7/90* (2026.01)
*H02J 50/12* (2016.01)

(52) U.S. Cl.
CPC .............. *H02J 50/80* (2016.02); *H02J 7/933* (2026.01); *H02J 50/12* (2016.02)

(58) Field of Classification Search
CPC ........ H02J 50/80; H02J 7/00712; H02J 50/12; H02J 7/00034; H02J 50/10; H02J 7/00; H02J 50/00; H02J 50/40
See application file for complete search history.

(56) References Cited

U.S. PATENT DOCUMENTS 8,656,193 B2 * 2/2014 Hijazi ..................... G06F 1/263 713/340
9,350,183 B2 * 5/2016 Park .......................... H02J 7/00
(Continued)

FOREIGN PATENT DOCUMENTS

KR 10-2014-0086000 7/2014
KR 10-1752250 7/2017
(Continued)

OTHER PUBLICATIONS

PCT International Application No. PCT/KR2020/019409, International Search Report dated Apr. 19, 2021, 4 pages.

*Primary Examiner* — Jared Fureman
(74) *Attorney, Agent, or Firm* — LEE, HONG, DEGERMAN, KANG & WAIMEY

(57) ABSTRACT

A wireless power reception device according to an embodiment of the present specification relates to a wireless power reception device for receiving wireless power from a wireless power transmission device, wherein the wireless power reception device can receive additional power from an additional power source in addition to the wireless power, and enters a suspend state for receiving the wireless power transmitted according to a power transmission contract for a predetermined time on the basis of a variation in the additional power while receiving the wireless power from the
(Continued)

wireless power transmission device according to the power transmission contract established by the wireless power transmission device.

8 Claims, 23 Drawing Sheets

(56) References Cited

U.S. PATENT DOCUMENTS

| | | | | |
|---|---|---|---|---|
| 9,728,989 | B2 * | 8/2017 | Kim | H02J 7/02 |
| 10,686,330 | B2 * | 6/2020 | Shevde | H02J 50/00 |
| 10,797,502 | B2 * | 10/2020 | Fan | H02J 7/0071 |
| 11,011,945 | B2 * | 5/2021 | Shirsat | H02J 50/80 |
| 12,057,725 | B2 * | 8/2024 | Liao | H02J 50/12 |
| 2012/0229084 | A1 * | 9/2012 | Gu | H02J 7/02<br>320/108 |
| 2016/0329751 | A1 * | 11/2016 | Mach | H02J 50/90 |
| 2019/0260240 | A1 * | 8/2019 | Kwon | H02J 7/00034 |

FOREIGN PATENT DOCUMENTS

| | | |
|---|---|---|
| KR | 10-2019-0000363 | 1/2019 |
| KR | 10-2019-0054334 | 5/2019 |
| WO | 2014-157095 | 10/2014 |

* cited by examiner

FIG. 3b

| | b7 | b6 | b5 | b4 | b3 | b2 | b1 | b0 |
|---|---|---|---|---|---|---|---|---|
| Byte 0 | Application Profile | | | | | | | |
| Byte 1 | Version | | | | | | | |
| Byte 2-N-1 | Profile-specific data | | | | | | | |

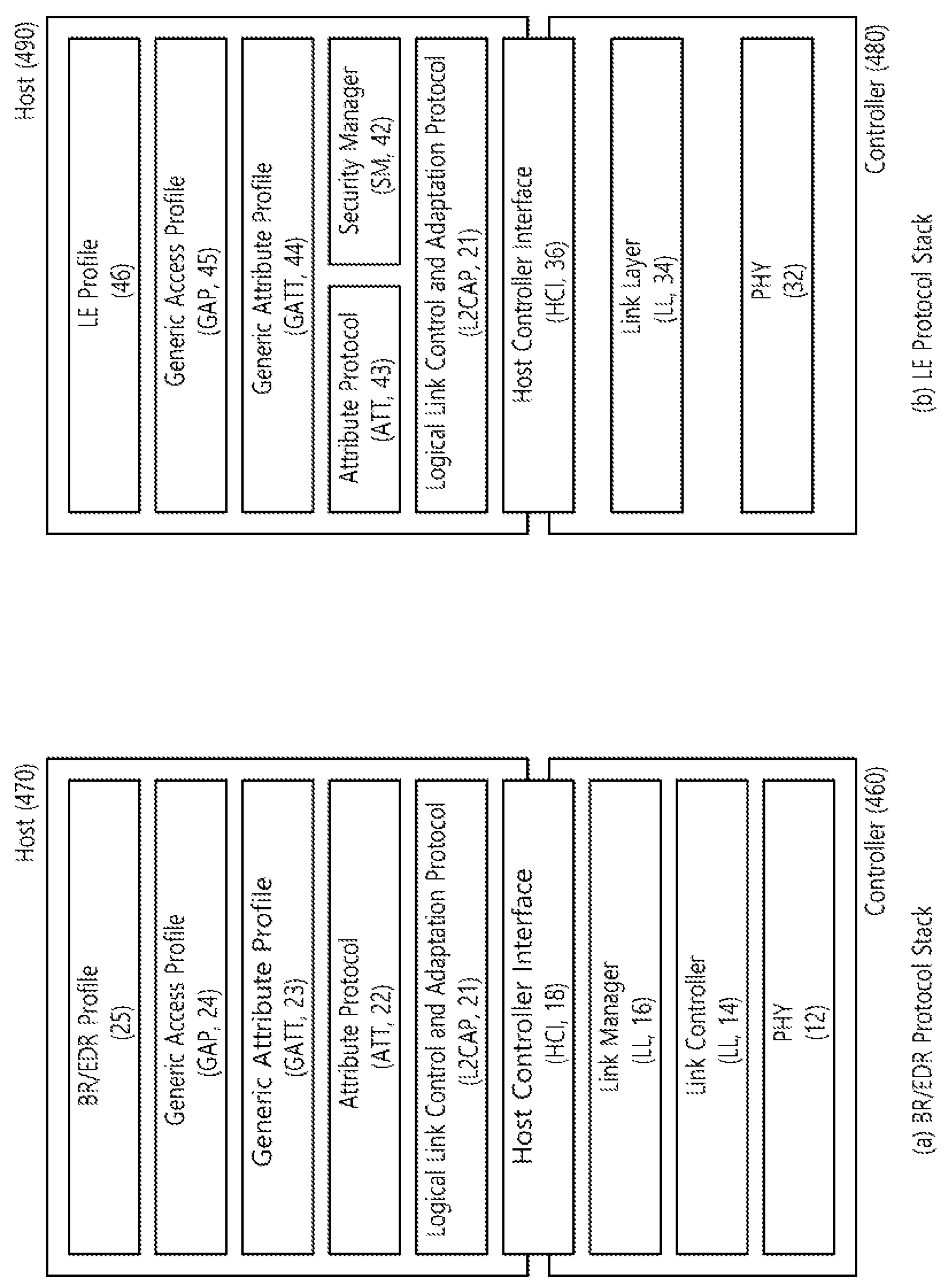
(a) BR/EDR Protocol Stack
(b) LE Protocol Stack

FIG. 5

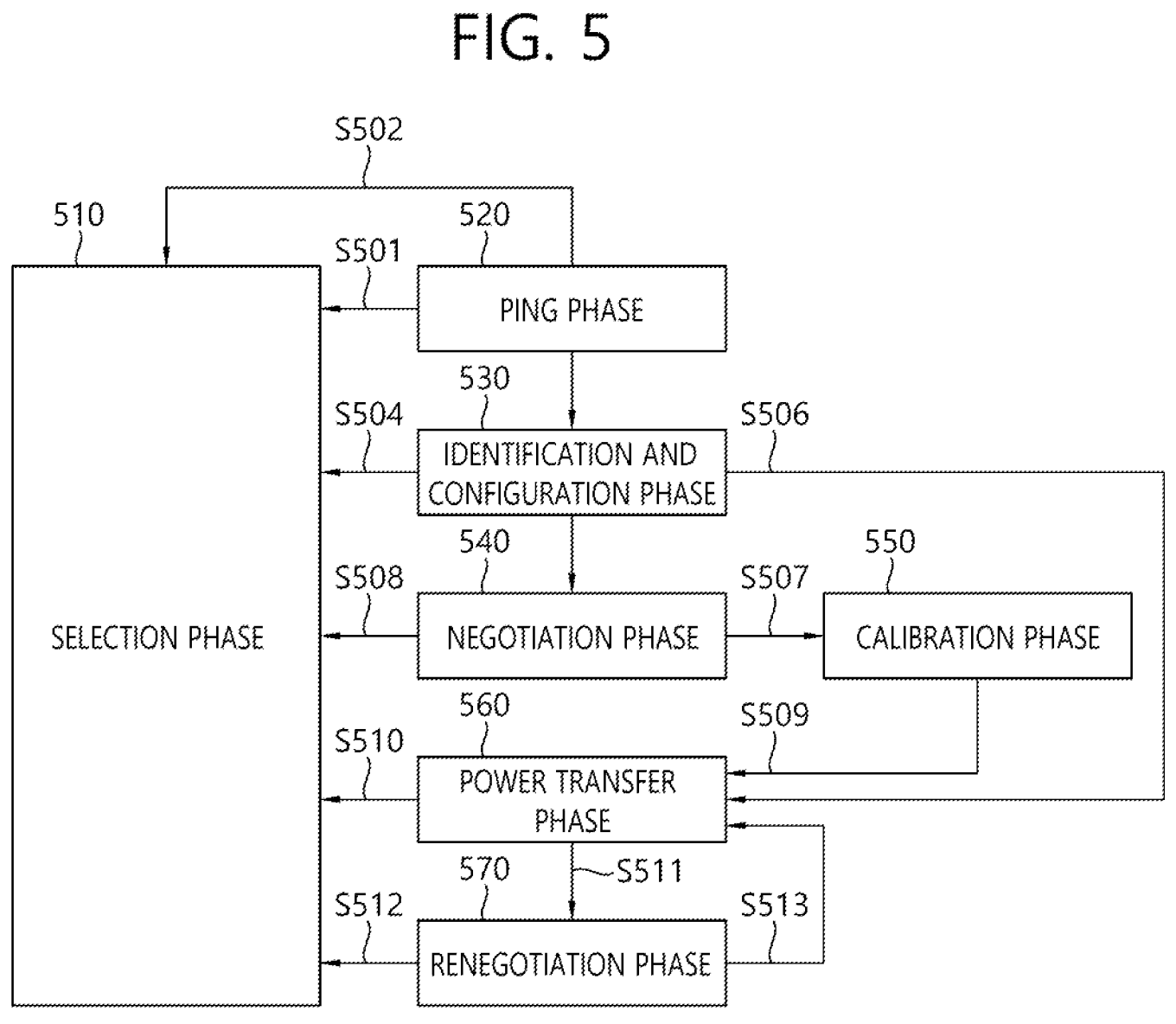

510 SELECTION PHASE
520 PING PHASE
530 IDENTIFICATION AND CONFIGURATION PHASE
540 NEGOTIATION PHASE
550 CALIBRATION PHASE
560 POWER TRANSFER PHASE
570 RENEGOTIATION PHASE
S501
S502
S504
S506
S507
S508
S509
S510
S511
S512
S513

FIG. 6

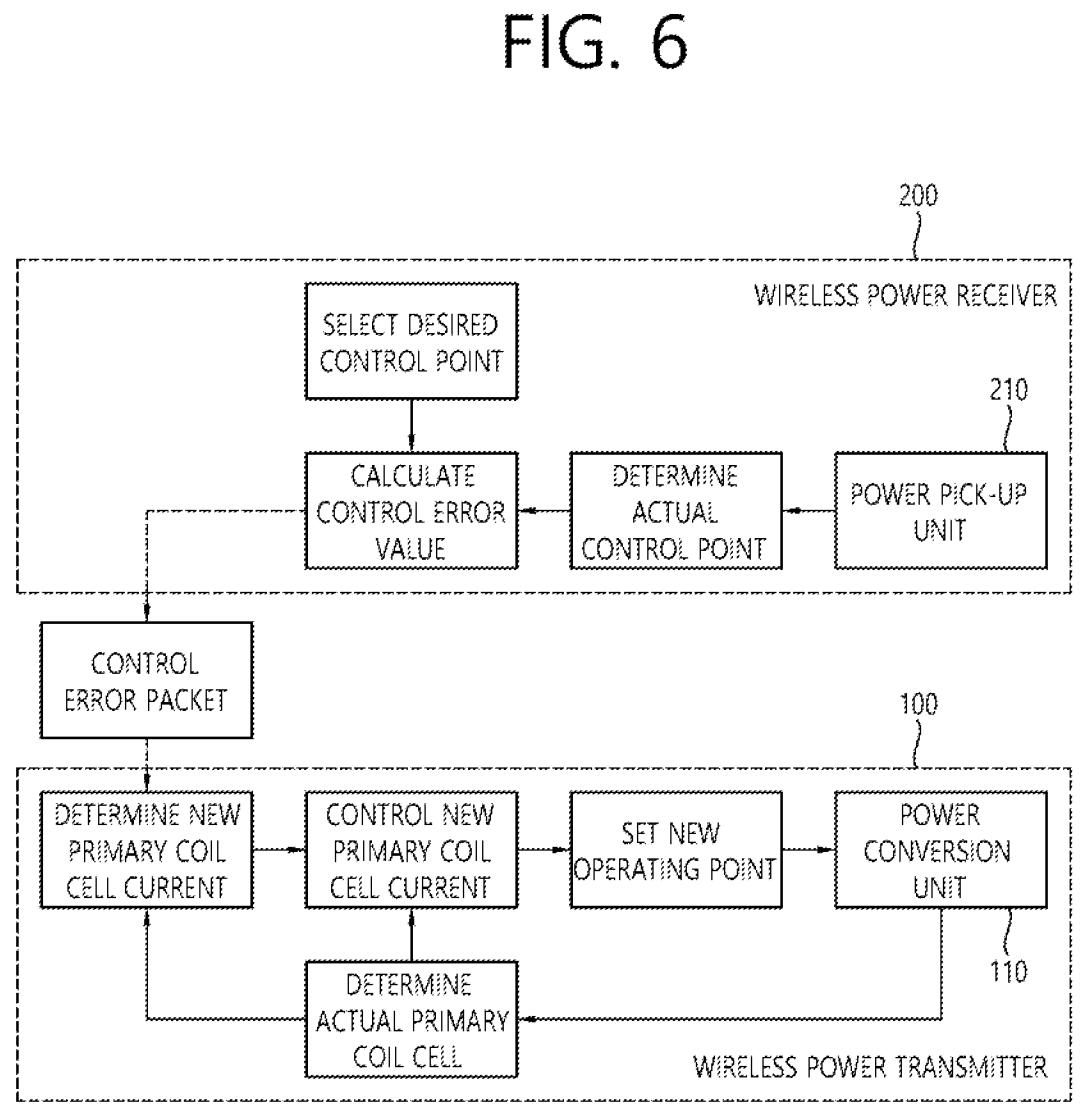

200
WIRELESS POWER RECEIVER
210
POWER PICK-UP UNIT
DETERMINE ACTUAL CONTROL POINT
SELECT DESIRED CONTROL POINT
CALCULATE CONTROL ERROR VALUE
CONTROL ERROR PACKET
100
WIRELESS POWER TRANSMITTER
110
POWER CONVERSION UNIT
SET NEW OPERATING POINT
CONTROL NEW PRIMARY COIL CELL CURRENT
DETERMINE ACTUAL PRIMARY COIL CELL
DETERMINE NEW PRIMARY COIL CELL CURRENT

FIG. 8

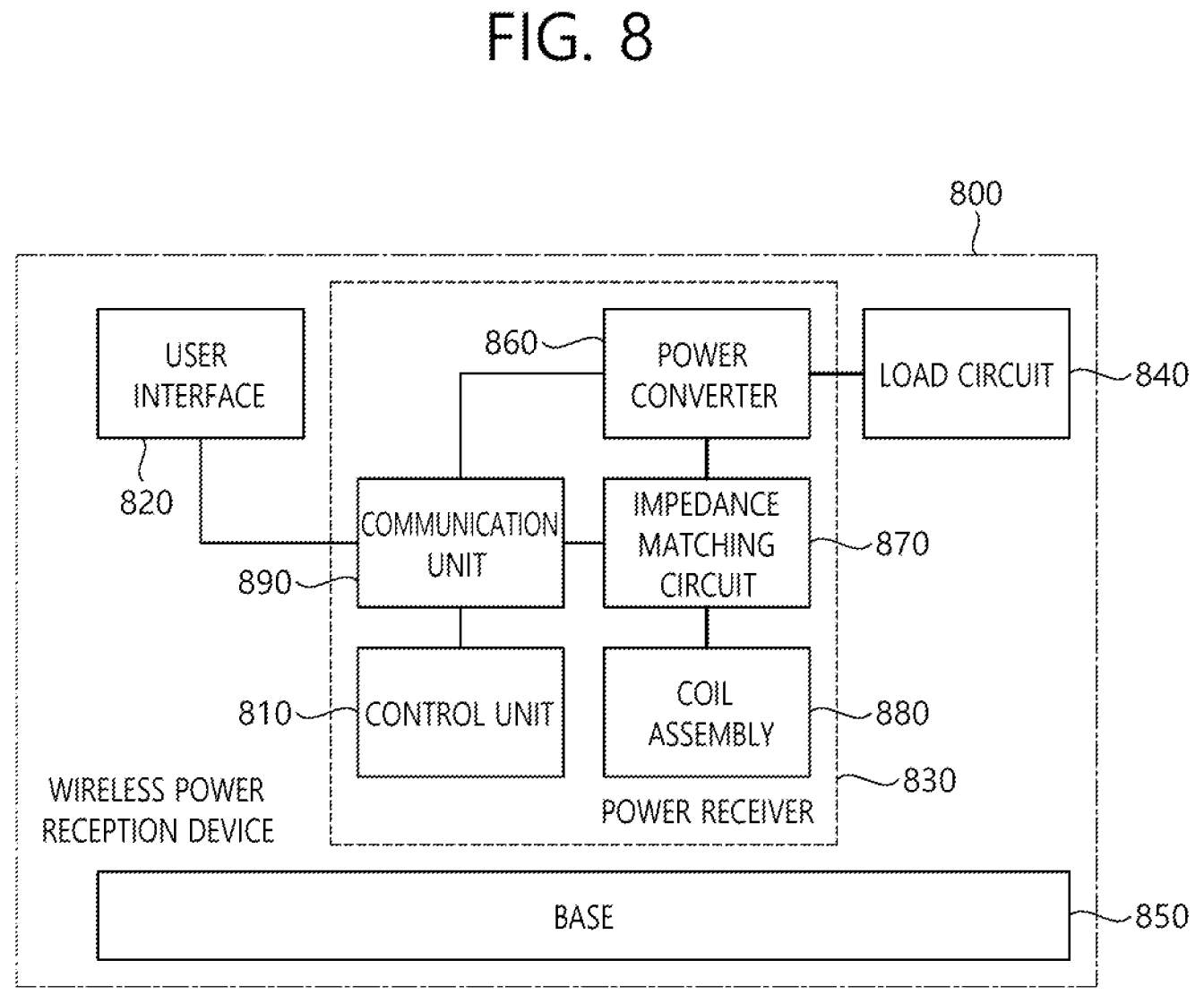

800
LOAD CIRCUIT
840
POWER CONVERTER
860
IMPEDANCE MATCHING CIRCUIT
870
COIL ASSEMBLY
880
830
POWER RECEIVER
COMMUNICATION UNIT
890
CONTROL UNIT
810
USER INTERFACE
820
WIRELESS POWER RECEPTION DEVICE
BASE
850

FIG. 9

| | b7 | b6 | b5 | b4 | b3 | b2 | b1 | b0 |
|---|---|---|---|---|---|---|---|---|
| B0 | Certificate Structure Version | | | | | | | |
| B1 | Reserved | | | | | Certificate Type | | |
| B2 | Signature Offset | | | | | | | |
| B3 ••• B11 | MSB | Serial Number | | | | | | LSB |
| B12 ••• B17 | Issuer ID | | | | | | | |
| B18 ••• B23 | Subject ID | | | | | | | |
| B24 ••• B56 | Public Key | | | | | | | |
| — | Future extensions may have additional field in this area | | | | | | | |
| $B_{signature\_offset}$ ••• $B_{signature\_offset+63}$ | Signature | | | | | | | |

FIG. 10

| | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | Guaranteed Power Value | | | | | |
| $B_1$ | Reserved | | Potential Power Value | | | | | |
| $B_2$ | AI | AR | OB | Reserved | | | WPID | Not Res Sens |

FIG. 11

| | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | Maximum Power value | | | | | |
| $B_1$ | Reserved | | | | | | | |
| $B_2$ | Prop | AI | AR | OB | ZERO | Count | | |
| $B_3$ | Window Size | | | | | Window Offset | | |
| $B_4$ | Neg | Polarity* | Depth* | | Reserved | | | |

Power Receiver to Power Transmitter data stream
RP
ACK
ADC
/gp/8
ACK
CE
ADT
even/6
ACK
CE
ADT
odd/2
ACK
CE
RP
ACK
CE
CE
ADC
/end
ACK
CE
CE
CE
Power Transmitter to Power Receiver data stream
RP
ATN
DSR
/poll
ADC
/gp/4
CE
DSR
/ack
ADT
even/3
CE
DSR
/ack
ADT
odd/1
CE
RP
ACK
CE
CE
DSR
/ack
ADC
/end
CE
DSR
/ack
CE 1100
1110
Load
1120
Internal DC-DC Converter
1130
Internal DC-DC
1140
Charger Unit
1150
1151
Rx Coils (Resonator)
1152
Rectifier
1153
Control Unit
1154
DC-DC Converter
1155
Output disconnect
Laptop
1200
AC Adapter
1300
1310
Battery Cells
1320
Backup Thermal Protection
1330
Battery Controller Chip
Power Bus
System Management (SM) data bus
1400
Wireless Power Transmitter

WIRELESS POWER RECEPTION DEVICE, WIRELESS POWER RECEPTION METHOD, AND WIRELESS CHARGING SERVICE PROVIDING METHOD

CROSS-REFERENCE TO RELATED APPLICATIONS

This application is the National Stage filing under 35 U.S.C. 371 of International Application No. PCT/KR2020/019409, filed on Dec. 30, 2020, which claims the benefit of earlier filing date and right of priority to Korean Application No. 10-2020-0007483, filed on Jan. 20, 2020, the contents of which are all hereby incorporated by reference herein in their entireties.

BACKGROUND OF THE DISCLOSURE

Field of the Disclosure

The present specification relates to a wireless power receiver for receiving wireless power from a wireless power transmitter, a method for receiving wireless power from a wireless power transmitter, and a method for providing a wireless charging service between the wireless power receiver and the wireless power transmitter.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

An object of the present specification is to provide a wireless power receiver capable of receiving power from other power sources in addition to the wireless power transmitted from the wireless power transmitter, and a wireless power receiving method of the wireless power receiver.

Alternatively, it is to provide a wireless charging service that can selectively provide a wireless charging service according to a wireless power receiving device.

A wireless power receiver according to an embodiment of the present specification for solving the above problems relates to a wireless power receiver for receiving wireless power from a wireless power transmitter, the wireless power receiver may receive additional power from an additional power supply in addition to the wireless power, while receiving the wireless power from the wireless power transmitter according to the power transfer contract established with the wireless power transmitter, based on the variation of the additional power, it enters a suspend state in which the wireless power transmitted according to the power transfer contract is received for a predetermined period of time.

A wireless power receiving method according to an embodiment of the present specification for solving the above problems relates to a wireless power receiving method by a wireless power receiving device for receiving wireless power from a wireless power transmitting device, the wireless power receiver may receive additional power from an additional power supply in addition to the wireless power, receive the wireless power from the wireless power transmitter according to the power transfer contract established with the wireless power transmitter, and enter a suspend state in which the wireless power transmitted according to the power transfer contract is received for a predetermined time based on the change in the additional power.

Other specific details of this specification are included in the detailed description and drawings.

In addition to the wireless power transmitted from the wireless power transmitter, the wireless power receiver capable of receiving power from another power source can cope with a case in which the power situation provided from another power source is changed while the wireless power receiver is receiving wireless power.

Alternatively, a wireless charging service may be selectively provided according to the wireless power receiver.

Effects according to the present specification are not limited by the contents exemplified above, and more various effects are included in the present specification.

BRIEF DESCRIPTION OF THE DRAWINGS

FIG. 3*b* shows an example of a WPC NDEF in a wireless power transfer system.

FIG. 4*b* is a diagram illustrating an example of a Bluetooth communication architecture to which an embodiment according to the present disclosure may be applied.

FIG. 5 is a state transition diagram for describing a wireless power transfer procedure.

FIG. 6 shows a power control method according to an exemplary embodiment of the present disclosure.

FIG. 8 shows a wireless power receiver according to another exemplary embodiment of the present disclosure.

FIG. 9 shows a communication frame structure according to an exemplary embodiment of the present disclosure.

FIG. 10 is a capability packet structure of a wireless power transmitter according to an exemplary embodiment of the present disclosure.

FIG. 11 is a configuration packet structure of a wireless power receiver according to an exemplary embodiment of the present disclosure.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
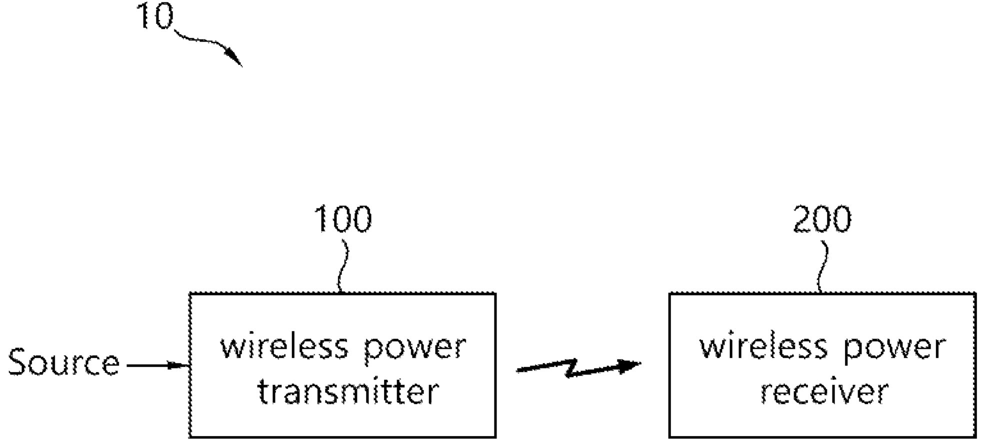
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source(S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
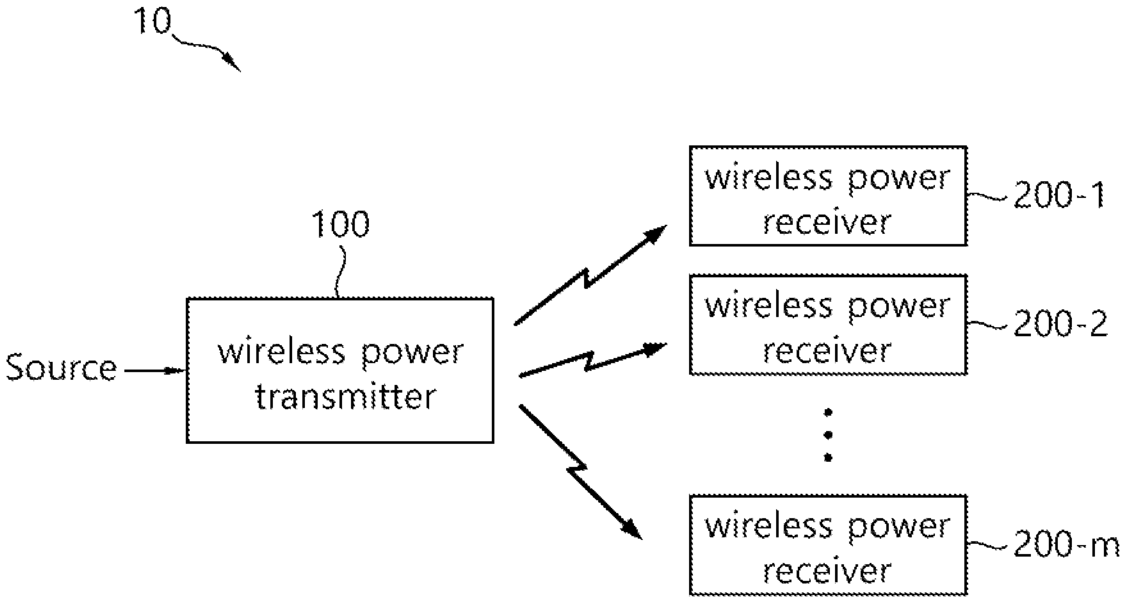
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
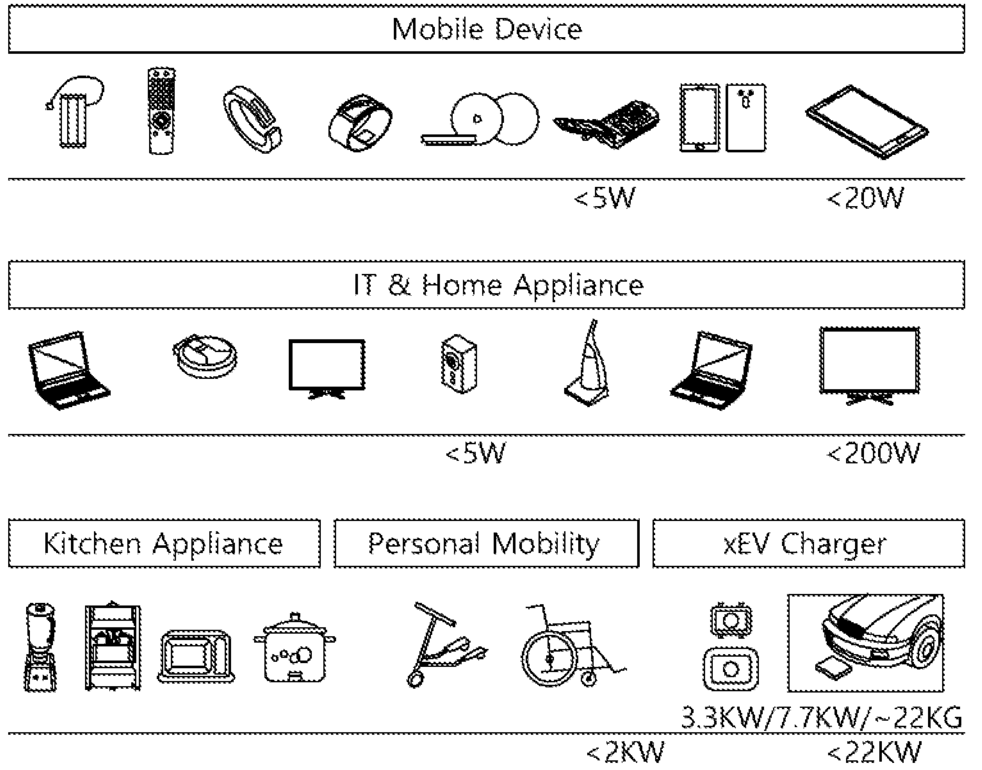
FIG. 3*a* shows an exemplary embodiment of diverse electronic devices adopting a wireless power transfer system.

FIG. 3*a* shows an exemplary embodiment of diverse electronic devices adopting a wireless power transfer system.

As shown in FIG. 3*a*, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB.

The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3*b* shows an example of a WPC NDEF in a wireless power transfer system.

Referring to FIG. 3*b*, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
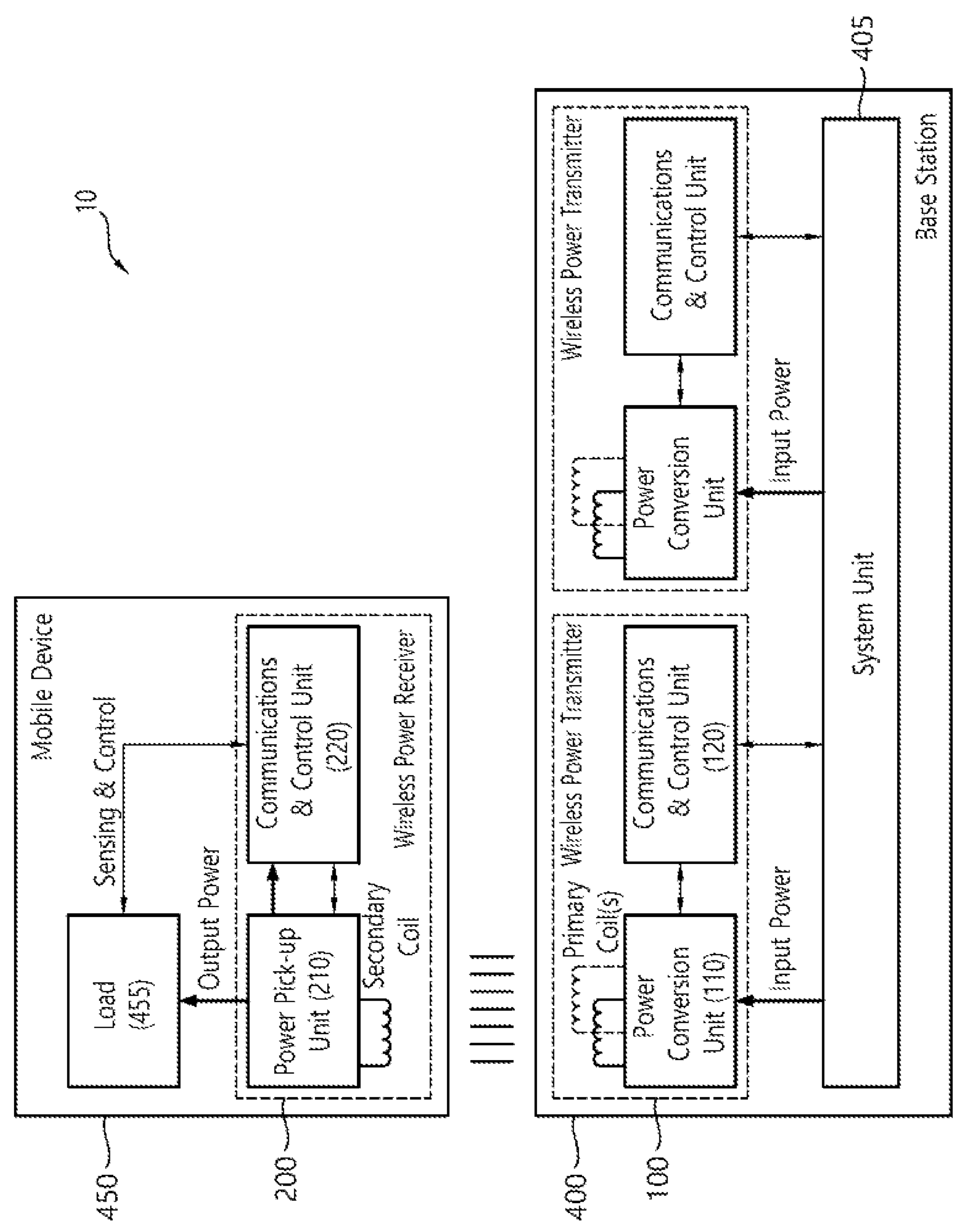
FIG. 4*a* is a block diagram of a wireless power transfer system according to another exemplary embodiment of the present disclosure.

FIG. 4*a* is a block diagram of a wireless power transfer system according to another exemplary embodiment of the present disclosure.

Referring to FIG. 4*a*, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4*a*, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4*b*.

FIG. 4*b* is a diagram illustrating an example of a Bluetooth communication architecture to which an embodiment according to the present disclosure may be applied.

Referring to FIG. 4*b*, (a) of FIG. 4*b* shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4*b*, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 μs for each channel.

The link manager layer 16 controls an overall operation (link setup, control, security) of Bluetooth connection by utilizing a link manager protocol (LMP).

The link manager layer 16 may perform the following functions.

- Performs ACL/SCO logical transport, logical link setup, and control.
- Detach: It interrupts connection and informs a counterpart device about a reason for the interruption.
- Performs power control and role switch.
- Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4*b*, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make a supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as “Bluetooth devices”) perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in a Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4*a*, The load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
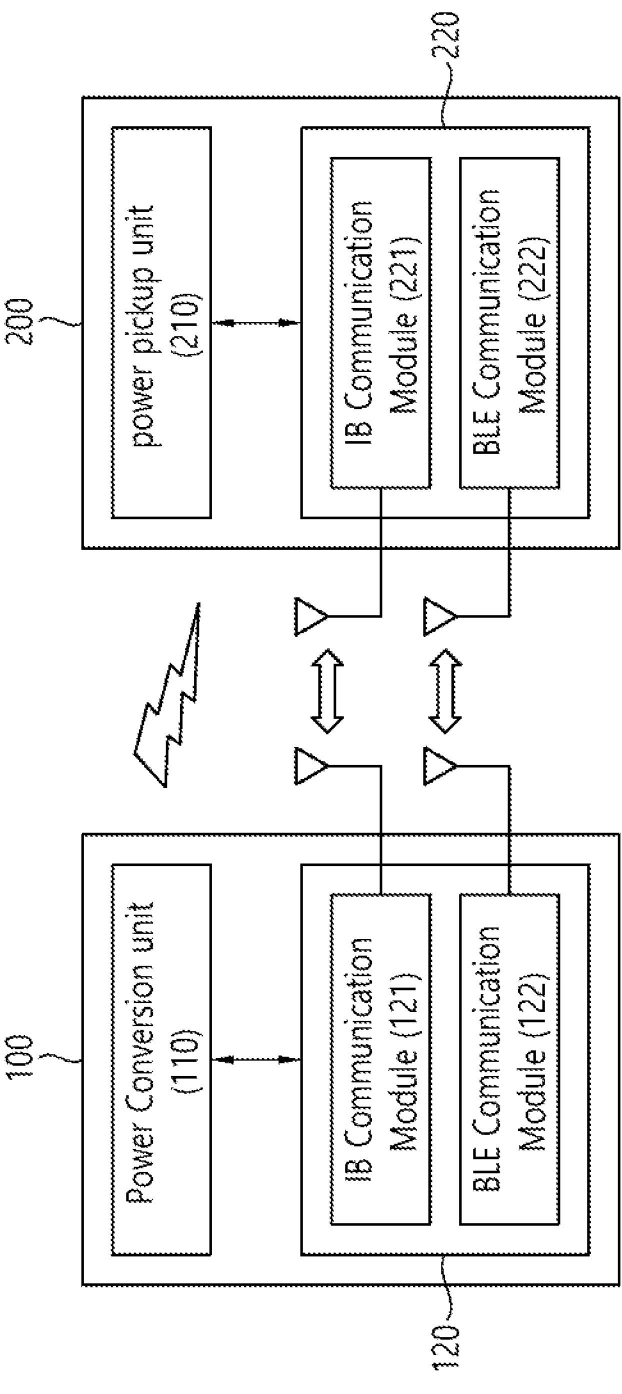
FIG. 4*c* is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4*c*.

FIG. 4*c* is a block diagram illustrating a wireless power transfer system using BLE communication according to an example.

Referring to FIG. 4*c*, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4*b*. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
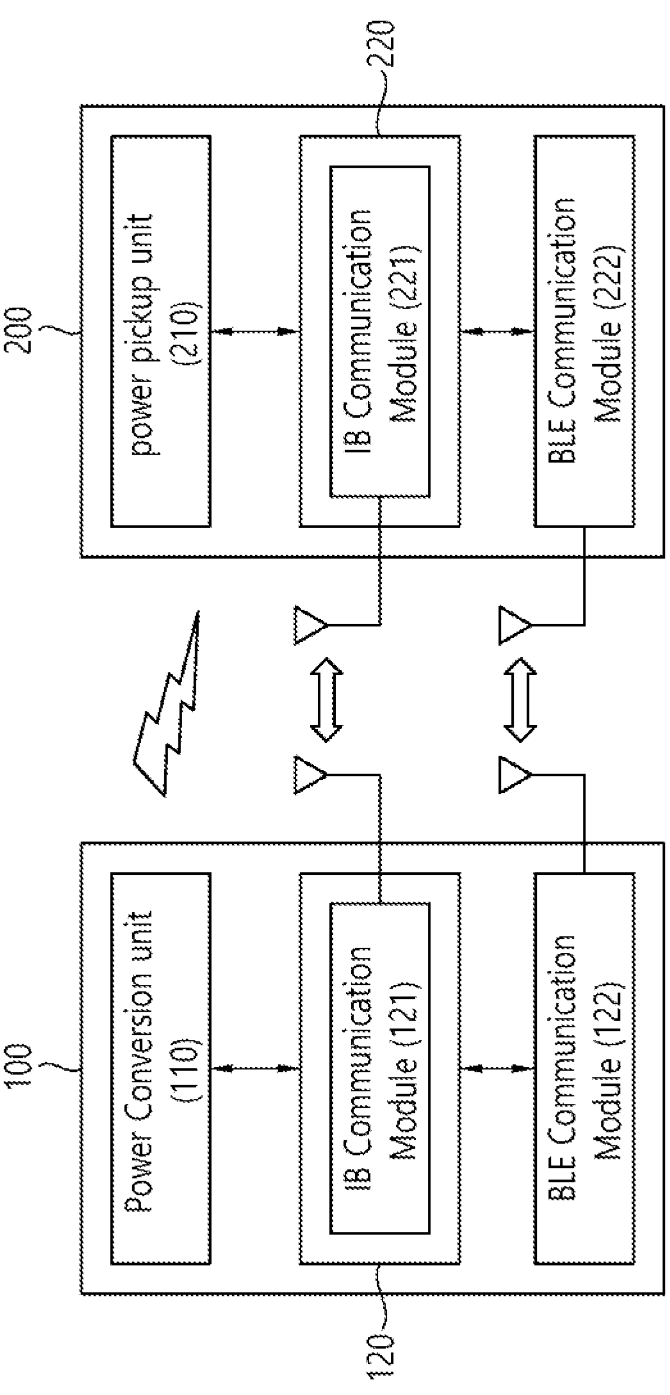
FIG. 4*d* is a block diagram illustrating a wireless power transfer system using BLE communication according to another example.

FIG. 4*d* is a block diagram illustrating a wireless power transfer system using BLE communication according to another example.

Referring to FIG. 4*d*, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure.

Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point-amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
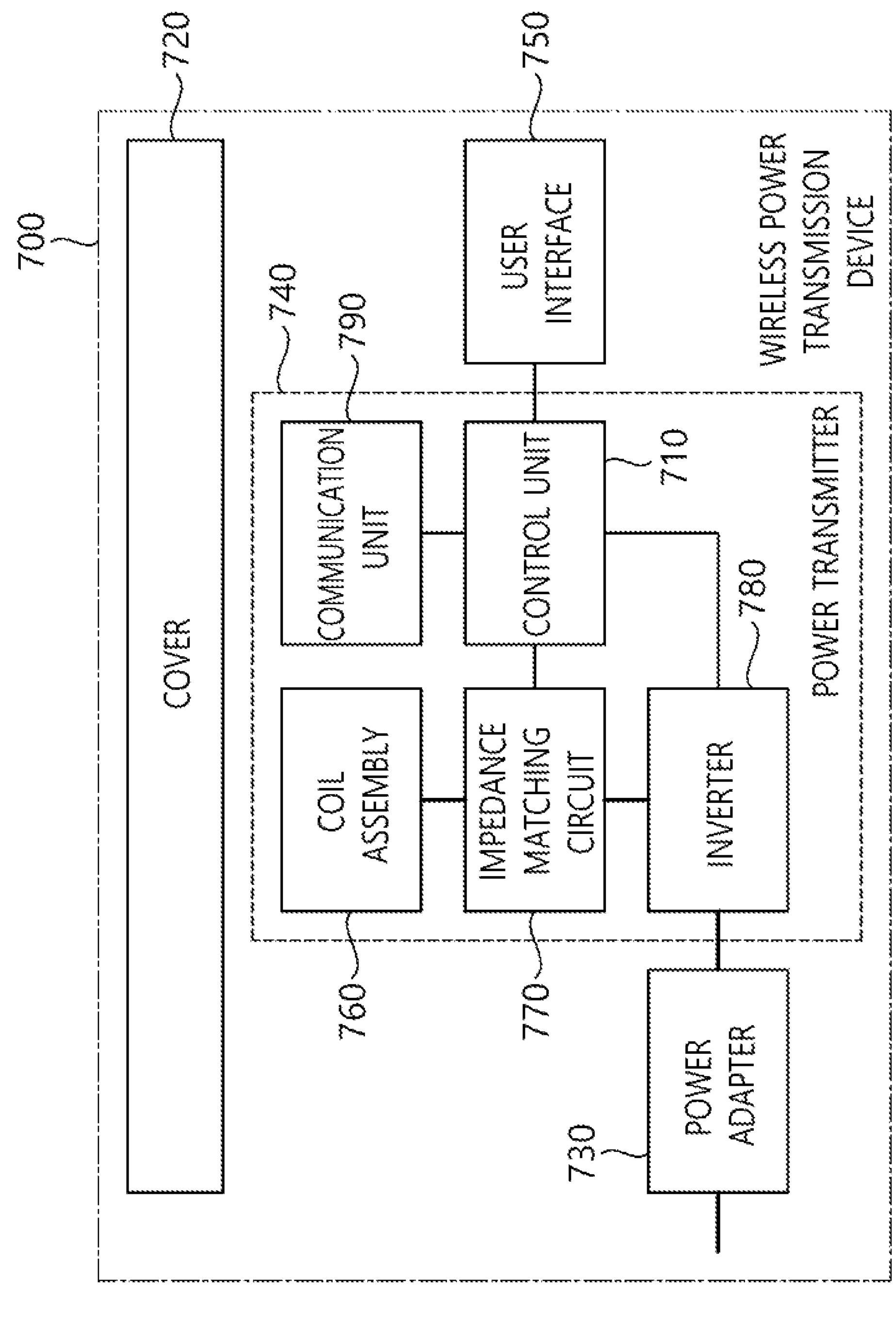
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver.

The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Hereinafter, authentication between a wireless power transmitter and a wireless power receiver will be disclosed.

The wireless power transfer system using in-band communication may use USB-C authentication. The authentication may include an authentication of the wireless power transmitter that is performed by the wireless power receiver (i.e., PTx Authentication by PRx), and an authentication of the wireless power receiver that is performed by the wireless power transmitter (PRx Authentication by PTx).

FIG. 9 is a block diagram showing a wireless charging certificate format according to an exemplary embodiment of the present disclosure.

Referring to FIG. 9, the wireless charging certificate format includes a Certificate Structure Version, a reserved field, PTx and leaf indicators, a certificate type, a signature offset, a serial number, an issuer ID, a subject ID, a public key, and a signature.

The certificate type may, for example, by assigned with 3 bits, and the certificate type may indicate that the corresponding certificate is any one of a root certificate, an intermediate certificate, and a last certificate. And, the certificate type may also indicate that the corresponding certificate is a certificate relating to a wireless power transmitter or a wireless power receiver or all type.

For example, the certificate type is 3 bits and may indicate information on a root certificate, manufacturer/secondary certificate, and product unit certificate (for the power transmitter). More specifically, a certificate type '001'b may indicate the root certificate, and '010'b may indicate an intermediate certificate (manufacturer/secondary Certificate), and '111'b may indicate a product unit certificate for the power transmitter, which is a final certificate.

The wireless power transmitter may notify (or announce) whether or not it supports the authentication function to the wireless power receiver by using a capability packet (in case of an authentication of the wireless power transmitter by the wireless power receiver (authentication of PTx by PRx)). Meanwhile, the wireless power receiver may notify (or announce) whether or not it supports the authentication function to the wireless power transmitter by using a capability packet (in case of an authentication of the wireless power receiver by the wireless power transmitter (authentication of PRx by PTx)). Hereinafter, a structure of indication information (a capability packet and a configuration packet) related to whether or not a device supports the authentication function will be disclosed and described in detail.

FIG. 10 is a capability packet structure of a wireless power transmitter according to an exemplary embodiment of the present disclosure.

Referring to FIG. 10, a capability packet having a respective header value of 0X31 is assigned with 3 bytes. Herein, a first byte (B0) includes a power class and a guaranteed power value, a second byte (B1) includes a reserved field and a potential power field, and a third byte (B2) includes an Authentication Initiator (AI), an Authentication Responder (AR), a reserved field, a WPID, and a Not Res Sens field. More specifically, the Authentication Initiator (AI) is assigned with 1 bit. Herein, for example, if the value is equal to '1b', this may indicate that the corresponding wireless power transmitter may operate as the authentication initiator. Additionally, the Authentication Responder (AR) is also assigned with 1 bit. Herein, for example, if the value is equal to '1b', this may indicate that the corresponding wireless power transmitter may operate as the authentication responder.

FIG. 11 is a configuration packet structure of a wireless power receiver according to an exemplary embodiment of the present disclosure.

Referring to FIG. 11, a capability packet having a respective header value of 0X51 is assigned with 5 bytes. Herein, a first byte (B0) includes a power class and a maximum power value, a second byte (B1) includes an AI, an AR, a reserved field, a third byte (B2) includes a Prop, a reserved field, a ZERO field, and a Count field, a fourth value (B3) includes a Window size and a window offset, and a fifth byte (B4) includes a Neg field, a polarity field, a Depth field, an authentication field (Auth), and a reserved field. More specifically, the Authentication Initiator (AI) is assigned with 1 bit. Herein, for example, if the value is equal to '1b', this may indicate that the corresponding wireless power receiver may operate as the authentication initiator. Additionally, the Authentication Responder (AR) is also assigned with 1 bit. Herein, for example, if the value is equal to '1b', this may indicate that the corresponding wireless power receiver may operate as the authentication responder.

A message that is used during the authentication procedure is referred to as an authentication message. The authentication message is used for carrying information related to authentication. Herein, 2 different types of authentication messages exist. One type corresponds to an authentication request, and another type corresponds to an authentication response. The authentication request is transmitted by the authentication initiator, and the authentication response is transmitted by the authentication responder. Both the wireless power transmitter and the wireless power receiver may be the authentication initiator or the authentication responder. For example, in case the wireless power transmitter is the authentication initiator, the wireless power receiver becomes the authentication responder. And, in case the wireless power receiver is the authentication initiator, the wireless power transmitter becomes the authentication responder.

An authentication request message includes a GET_DIGESTS (i.e., 4 bytes), a GET_CERTIFICATE (i.e., 8 bytes), and a CHALLENGE (i.e., 36 bytes).

An authentication response message includes a DIGESTS (i.e., 4+32 bytes), a CERTIFICATE (i.e., 4+certificate chain (3×512 bytes)=1,540 bytes), a CHALLENGE_AUTH (i.e., 168 bytes), and an ERROR (i.e., 4 bytes).

An authentication message may be referred to as an authentication packet and may also be referred to as authentication data or authentication control information. Additionally, messages, such as GET_DIGEST, DIGESTS, and so on, may also be referred to as a GET_DIGEST packet, a DIGEST packet, and so on.

Figure 12:
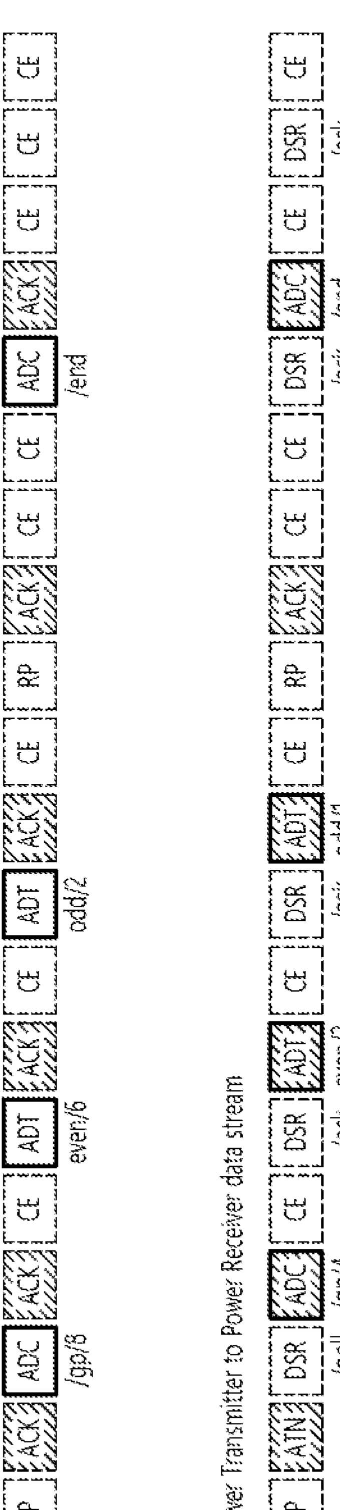
FIG. 12 shows an application-level data stream between a wireless power transmitter and a receiver according to an example.

FIG. 12 shows an application-level data stream between a wireless power transmitter and a receiver according to an example.

Referring to FIG. 12, a data stream may include an auxiliary data control (ADC) data packet and/or an auxiliary data transport (ADT) data packet.

The ADC data packet is used to open a data stream. The ADC data packet may indicate the type of a message included in a stream and the number of data bytes. Meanwhile, the ADT data packet is sequences of data including an actual message. An ADC/end data packet is used to indicate the end of the stream. For example, the maximum number of data bytes in a data transport stream may be limited to 2047.

ACK or NAC (NACK) is used to indicate whether the ADC data packet and the ADT data packet are normally received. Control information necessary for wireless charging such as a control error packet (CE) or DSR may be transmitted between transmission timings of the ADC data packet and the ADT data packet.

Using this data stream structure, authentication related information or other application level information may be transmitted and received between the wireless power transmitter and the wireless power receiver.

Hereinafter, a wireless power charging method of a wireless power receiver having a plurality of power sources will be described.

Figure 13:
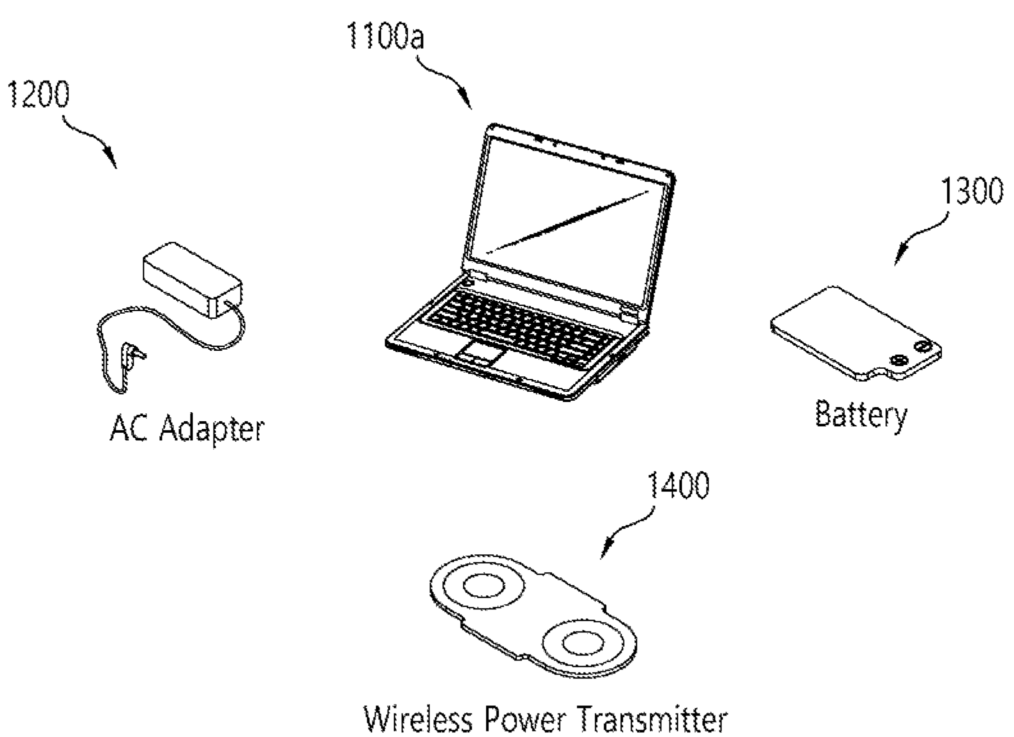
FIG. 13 is a diagram illustrating a wireless power receiver and power supplies of the wireless power receiver according to an embodiment.
Figure 14:
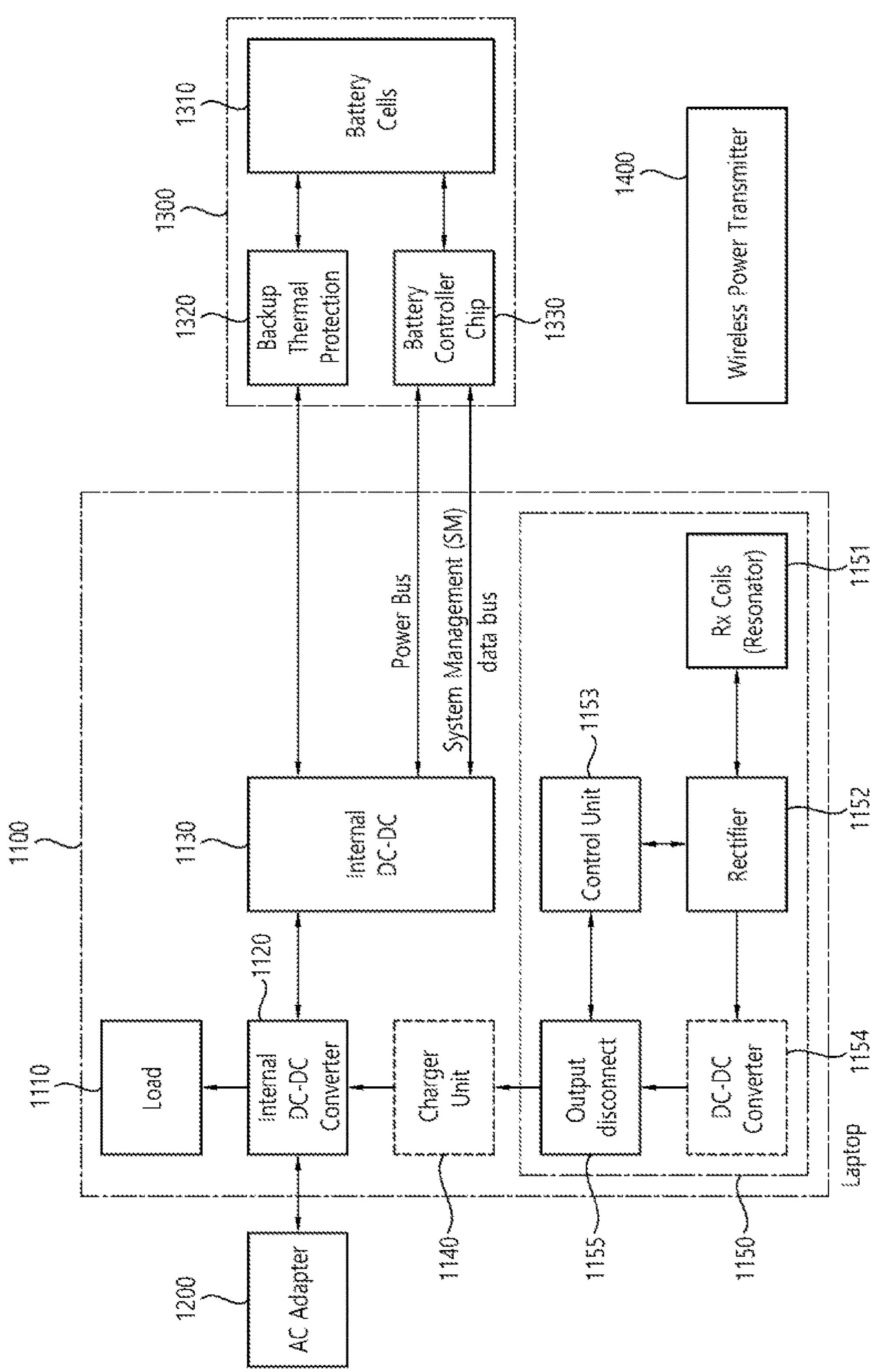
FIG. 14 is a block diagram schematically illustrating a power-related configuration of a wireless power receiver and power supplies according to an embodiment.

FIG. 13 is a diagram illustrating a wireless power receiver and power supplies of the wireless power receiver according to an embodiment, and FIG. 14 is a block diagram schematically illustrating a power-related configuration of a wireless power receiver and power supplies according to an embodiment.

Referring to FIG. 13, a laptop computer 1100*a*, such as a notebook, is generally operated using an AC adapter 1200 and a power supply such as a battery 1300.

In addition, the laptop computer 1100*a* capable of wireless charging may receive wireless power from the wireless power transmitter 1400 as a wireless power receiver. The wireless power transmitter 1400 may be a wireless power transmitter that provides guaranteed power of 30 W or more. The laptop computer 1100*a* may be used while charging the battery 1300 with the received wireless power, or the laptop computer 1100*a* may be operated with the received wireless power.

That is, the laptop computer 1100*a* capable of wireless charging may use the AC adapter 1200, the battery 1300, and the wireless power transmitter 1400 as a power supply source.

Referring to FIG. 14, like a laptop computer 1100*a*, the wireless power receiver 1100 using the AC adapter 1200, the battery 1300, and the wireless power transmitter 1400 as a power source may include a DC-DC converter 1120, a battery charging unit 1130, a wireless power receiving unit 1150, and the like.

The DC-DC converter 1120 converts DC power received from the AC adapter 1200 into DC power suitable for driving the wireless power receiver 1100. Some of the DC power output from the DC-DC converter 1120 may be transferred to the load 1110 to drive the wireless power receiver 1100. Another portion of the DC power may be transferred to the battery charging unit 1130 to charge the battery cell 1310.

The battery charging unit 1130 communicates with the battery control unit 1330 of the battery 1300 using the charging system management data bus to monitor and control the battery charging process and to control the charging power delivered to the battery using the power bus.

In addition, the battery charging unit 1130 may transmit power transmitted from the battery 1300 to the DC-DC converter 1120, so that the power of the battery 1300 is transmitted to the load 1110.

The battery 1300 may include a battery cell 1310, a thermal protection unit 1320, and a battery control unit 1330. The battery cell 1310 may be configured to charge/discharge electric energy, and the thermal protection unit 1320 may be configured to monitor the state of the battery cell 1310 to prevent overheating of the battery cell 1310. The thermal protection unit 1320 may provide state information of the battery cell 1310 to the battery charging unit 1130. The battery control unit 1330 may store parameters of the battery cell 1310, monitor the charging/discharging process in real time, and provide feedback to the battery charging unit 1130. Also, the battery controller 1330 may perform a statistical operation on the charge level of the battery cell 1310.

The wireless power receiving unit 1150 may include a receiving coil 1151, a rectifying unit 1152, a control unit 1153, a DC-DC converter 1154, and an output blocking unit 1155.

The receiving coil 1151 receives wireless power transmitted from the wireless power transmitter 1400. The rectifying unit 1152 may rectify the AC wireless power received by the receiving coil 1151 and convert it into DC power.

The control unit 1153 may control the received wireless power by controlling the rectifying unit 1152, and may communicate with the wireless power transmitter 1400. Communication with the wireless power transmitter 1400 may use in-band communication using an operating frequency at which the receiving coil 1151 receives wireless power and/or out-band communication (e.g. Bluetooth communication, etc.) using a frequency other than the operating frequency.

The DC-DC converter 1154 may convert DC power output from the rectification unit 1152 into DC power suitable for driving the wireless power receiver 1100. The DC-DC converter 1154 of the wireless power receiver 1150 may be omitted, in this case, after the DC power output from the rectifying unit 1152 is transferred to the DC-DC converter 1120 through the output blocking unit 1155 and the like, DC power may be converted into DC power suitable for driving the wireless power receiver 1100 by the DC-DC converter 1120.

The output blocking unit 1155 is controlled by the control unit 1153, the output blocking unit 1155 may block providing the power output from the DC-DC converter 1154 or the rectifying unit 1152 to the charging unit 114, alternatively, the output blocking unit 1155 may block providing the power output from the DC-DC converter 1154 or the rectifying unit 1152 to the charging unit 1140.

The charging unit 1140 may provide power provided from the wireless power receiving unit 1150 to the DC-DC converter 1120. FIG. 14 illustrates an example in which the charging unit 1140 and the control unit 1153 are configured separately, the charging unit 1140 and the control unit 1153 may be integrated into one circuit according to an embodiment.

As described above, the wireless power receiver 1100 may be operated by receiving power from an additional power source other than the wireless power transmitter 1400 or may charge a battery. FIG. 14 illustrates the AC adapter 1200 and the battery 1300 as additional power sources, examples of the additional power sources may be changed according to embodiments.

Figure 15:
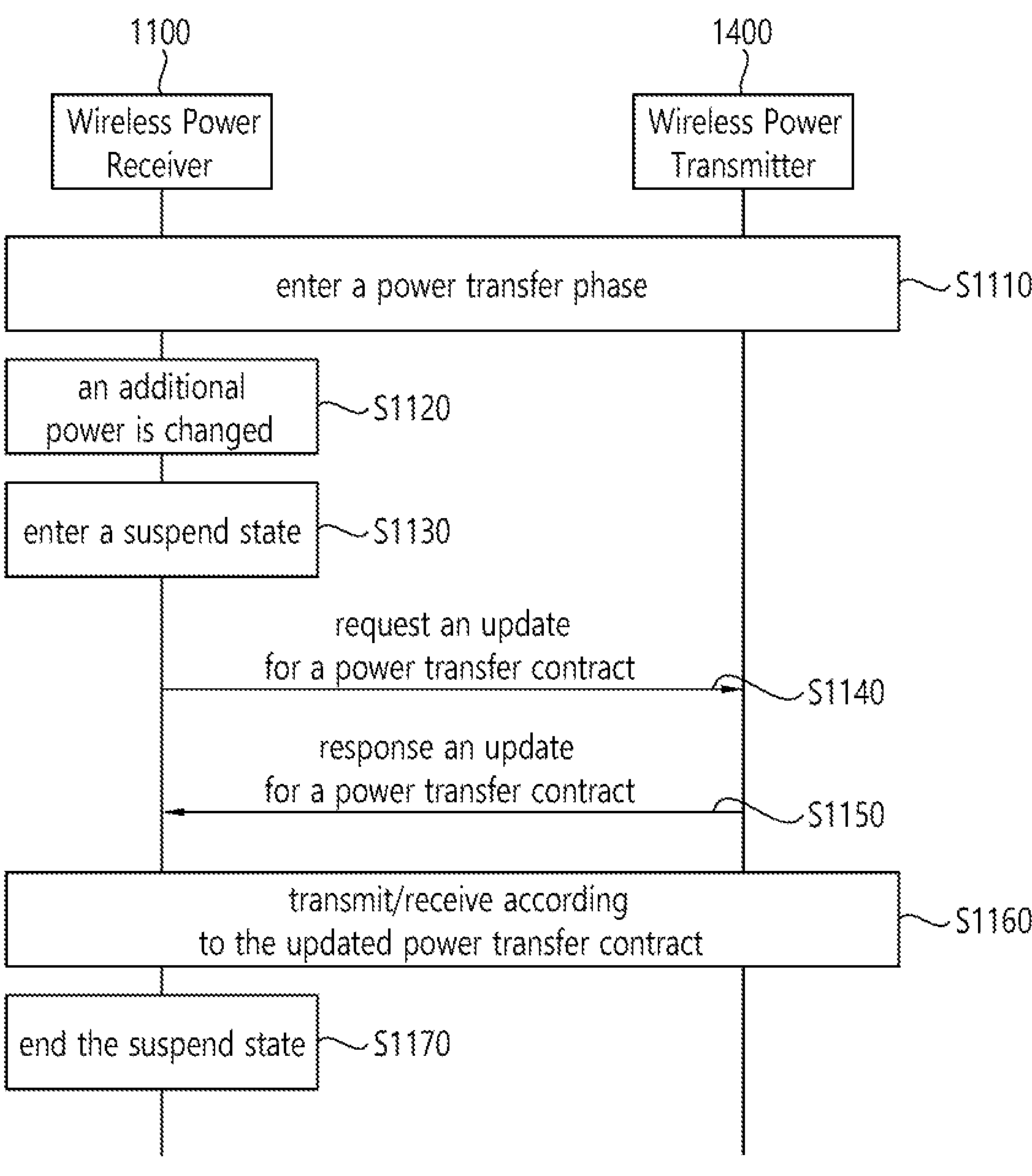
FIG. 15 is a flowchart illustrating a wireless power reception/transmission method according to an embodiment.

FIG. 15 is a flowchart illustrating a wireless power reception/transmission method according to an embodiment.

The wireless power receiver 1100 of FIG. 15 is a device that receives power from an additional power source other than the wireless power transmitter 1400, similar to that described with reference to FIGS. 13 and 14. For convenience of description, power received from a power source other than the wireless power received from the wireless power transmitter 1400 is referred to as additional power.

Referring to FIG. 15, the wireless power receiver 1100 and the wireless power transmitter 1400 enter the power transmission step S1110 through a protocol (for example, ping phase, configuration phase, negotiation phase, etc., see FIG. 5) for wireless charging.

The wireless power receiver 1100 may transmit information necessary for the baseline Power Transfer Contract to the wireless power transmitter 1400 using a Power Control Hold-off data packet (PCH) and a Configuration data packet (CFG) in the configuration step.

In addition, in the negotiation stage, by creating an extended power transfer contract or changing the elements of the basic power transfer contract/extended power transfer contract, the wireless power receiver 1100 and the wireless power transmitter 1400 may renew a power transfer contract.

In the power transmission step (S1110), the wireless power transmitter 1400 transmits wireless power to the wireless power receiver 1100 according to the power transfer contract confirmed in the configuration step or the negotiation step, the wireless power receiver 1100 receives wireless power from the wireless power transmitter 1400.

While the wireless power receiver 1100 receives wireless power in the power transmission step (S1110), the additional power may be changed (S1120). That is, for example, the wireless power receiver 1100 is similar to that shown in FIG. 13 or 14, in addition to the wireless power transmitter 1400, when additional power can be supplied from the AC adapter 1200 and the battery 1300, which are other additional power sources, the AC adapter 1200 and/or battery 1300 is removed to stop supply of additional power while the wireless power receiving device 1100 is receiving wireless power, or the AC adapter 1200 and/or the battery 1300 may be connected to the wireless power receiver 1100 to supply additional power while the wireless power receiving device 1100 is receiving wireless power.

Like this, when a change in additional power is detected in the power transmission step (S1110), the wireless power receiver 1100, where additional power may be supplied from other additional power sources in addition to the wireless power transmitter 1400 and the supply of additional power can be changed such as when the supply of additional power is interrupted or resumed, may be configured to enter the suspend state (S1130).

In the suspend state, the wireless power receiver 1100 receives wireless power according to an existing power transfer contract for a predetermined time ($t_{suspend}$).

And, within a predetermined time ($t_{suspend}$), the wireless power receiver 1100 may transmit a message requesting the update of the power transfer contract to the wireless power transmitter 1400 (S1140). Upon receiving the message requesting the update of the power transfer contract, the wireless power transmitter 1400 may transmit a response message to the message requesting the renewal of the power transfer contract to the wireless power receiver 1100 (S1150).

The message requesting the renewal of the power transfer contract may include a message notifying a change in additional power. The wireless power transmitter 1400 may transmit an ACK as a response message.

The message requesting the renewal of the power transfer contract may include a message for entering into a renegotiation or negotiation phase. For example, the message requesting the renewal of the power transfer contract may include a renegotiation data packet (NEGO). As a response message to the NEGO, the wireless power transmitter 1400 may transmit an ACK. Upon receiving the ACK from the wireless power transmitter 1400, the wireless power receiver 1100 may enter the renegotiation phase with the wireless power transmitter 1400.

Upon receiving the ACK for the NEGO, the wireless power receiver 1100 may transmit a Specific Request data packet (SRQ) to the wireless power transmitter 1400 with update information for updating the power transfer contract. For example, the wireless power receiver 1100 may transmit information on the guaranteed load power of the power transfer contract to be updated to the wireless power transmitter 1400 using the SRQ/gp packet. The wireless power receiver 1100 may transmit information on the correction power required according to a change in the additional power. For example, when the supply of additional power is stopped, the wireless power receiver 1100 may transmit an SRQ/gp packet requesting an increased guaranteed power to increase the guaranteed power from the guaranteed power of the existing power transfer contract.

The wireless power receiver 1100 that has received the ACK from the wireless power transmitter 1400 in response to the SRQ/gp packet transmits the SRQ/en packet to the wireless power transmitter 1400 to request the end of the renegotiation step. The wireless power transmitter 1400 transmits an ACK for the SRQ/en packet, the wireless power receiver 1100 receives the ACK in response to the SRQ/en packet, and the renegotiation step is terminated.

The renewal of the power transfer contract may be performed within a predetermined time ($t_{suspend}$).

The wireless power transmitter 1400 and the wireless power receiver 1100 after updating the power transfer contract and ending the renegotiation step enter the power transmission step according to the updated power transfer contract (S1160). The renewal of the power transfer contract and the entry of the power transmission phase according to the renewed power transfer contract may be made within a predetermined time (tsuspend).

Simultaneously or later, the suspend state is also terminated (S1170).

The length of the predetermined time (tsuspend) may vary according to a communication method between the wireless power transmitter 1400 and the wireless power receiver 1100. For example, the predetermined time (tsuspend) when the wireless power transmitter 1400 and the wireless power receiver 1100 transmit/receive information for updating the power transfer contract using out-band communication may be formed shorter than the predetermined time (tsuspend) when the wireless power transmitter 1400 and the wireless power receiver 1100 transmit/receive information for updating the power transfer contract using in-band communication. This is because, since the communication speed of out-band communication is faster than that of in-band communication, it is possible to renew the power transfer contract and complete the entry of the power transmission stage according to the renewed power transfer contract more quickly.

Figure 16:
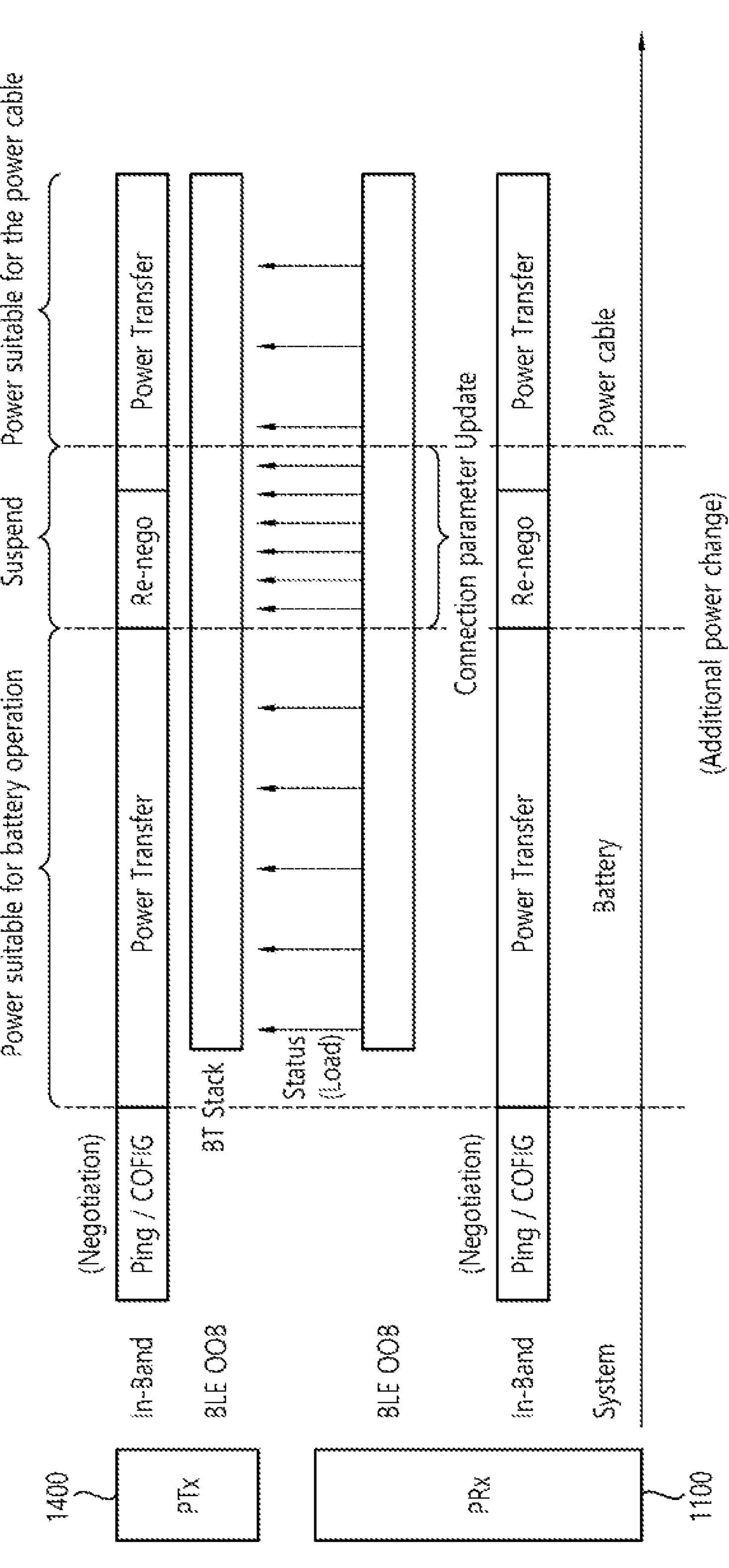
FIG. 16 is a flowchart for explaining a wireless power reception/transmission method according to an embodiment in a situation in which additional power of the wireless power receiver is changed from a battery to a power cable.
Figure 17:
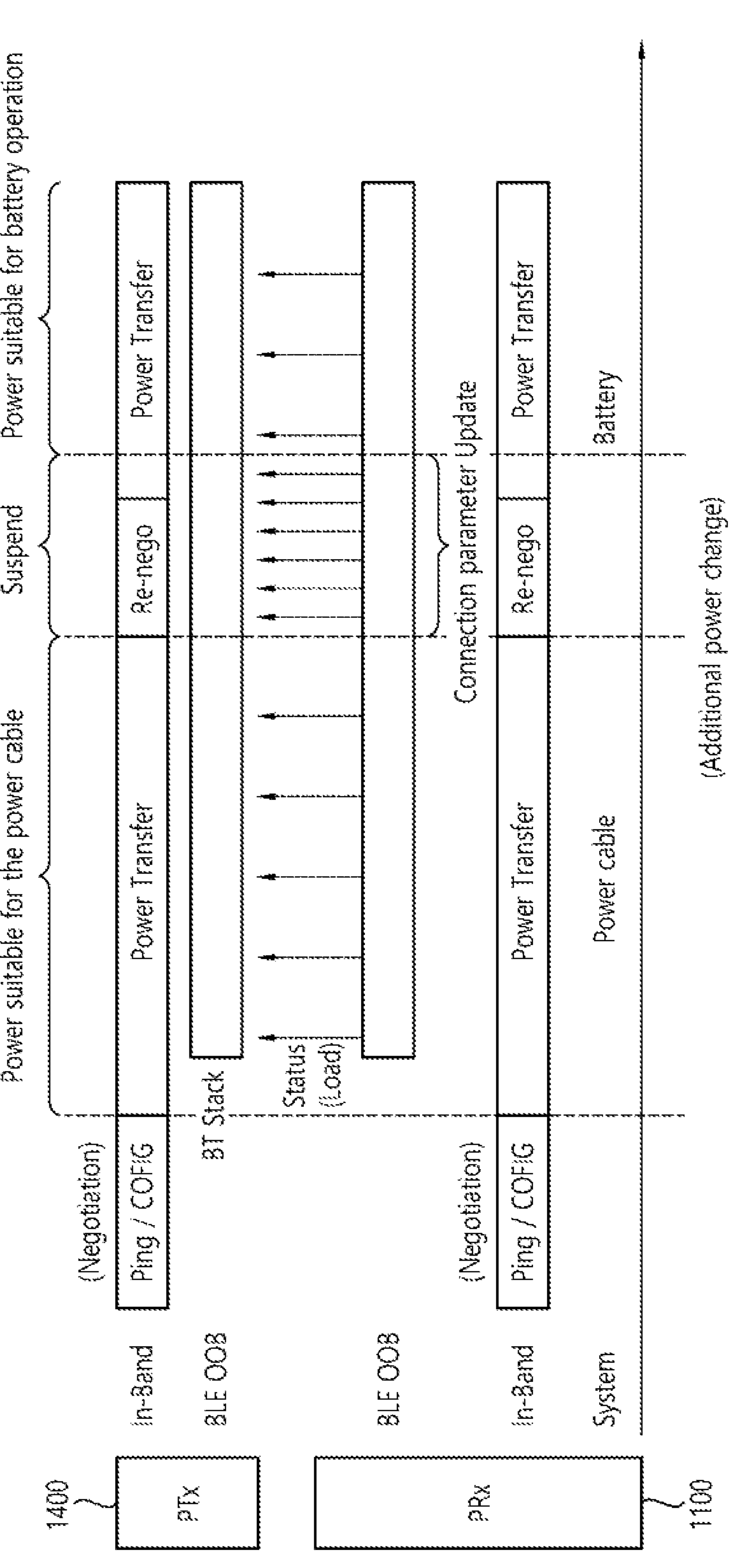
FIG. 17 is a flowchart illustrating a wireless power reception/transmission method according to an embodiment in a situation in which additional power of the wireless power receiver is changed from a power cable to a battery.

Meanwhile, FIG. 16 is a flowchart for explaining a wireless power reception/transmission method according to an embodiment in a situation in which additional power of the wireless power receiver is changed from a battery to a power cable, and FIG. 17 is a flowchart illustrating a wireless power reception/transmission method according to an embodiment in a situation in which additional power of the wireless power receiver is changed from a power cable to a battery.

FIGS. 16 and 17, the wireless power transmitter 1400 and the wireless power receiver 1100 communicate with each other using in-band communication and out-band communication (e.g., BLE). The wireless power receiver 1100 is a device that receives power from an additional power source other than the wireless power transmitter 1400, similar to that described with reference to FIGS. 13 to 15.

Referring to FIG. 16, the wireless power receiver 1100 receives power from the battery 1300 without receiving additional power from a power cable (e.g., an AC adapter). The wireless power receiver 1100 was receiving wireless power from the wireless power transmitter 1400 by performing a ping step, a configuration step, a (negotiation step), and a power transmission step with the wireless power transmitter 1400. And, during the power transmission step, a situation in which additional power by the power cable is additionally supplied to the wireless power receiver 1100 occurred.

Meanwhile, referring to FIG. 17, the wireless power receiver 1100 receives additional power from a power cable (e.g., an AC adapter) and the wireless power receiver 1100 was receiving wireless power from the wireless power transmitter 1400 by performing a ping step, a configuration step, a (negotiation step), and a power transmission step with the wireless power transmitter 1400. And during the power transmission step, the supply of additional power by the power cable is stopped and a situation in which power is supplied from the battery 1300 occurred.

As described in the description of FIG. 15, the wireless power receiver 1100 enters a suspend state and receives wireless power according to an existing power transfer contract for a predetermined time (tsuspend) since a change in additional power occurs. Then, the wireless power receiver 1100 enters the renegotiation phase with the wireless power transmitter 1400 and renews the power transfer contract to a power transfer contract suitable for the environment in which additional power is supplied by the power cable, the wireless power receiver 1100 re-enters the power transmission stage according to the updated power transfer contract.

Meanwhile, the wireless power receiver 1100 entering the suspend state may change some of communication characteristics with the wireless power transmitter 1400 in the suspend state. For example, in the suspend state, the wireless power receiver 1100 may reset the out-band communication interval with the wireless power transmitter 1400. FIGS. 16 and 17, the wireless power receiver 1100 may adjust the communication characteristics with the wireless power transmitter 1400 so that the out-band communication interval with the wireless power transmitter 1400 in the suspend state is shorter than in other states or stages. Through this, status information of the wireless power receiver 1100 according to a change in additional power can be transmitted to the wireless power transmitter 1400 more quickly. In addition, by transmitting the update information related to the renewal of the power transfer contract to the wireless power transmitter 1400 more quickly, the renewal of the power transfer contract may be completed more quickly.

The predetermined time ($t_{suspend}$) may be set in consideration of the communication interval between the wireless power transmitter 1400 and the wireless power receiver 1100, the size of packets transmitted/received in the suspend state, and the like.

The wireless power receiving apparatus in the embodiment according to FIGS. 13 to 17 corresponds to the wireless power receiving apparatus or the wireless power receiver or the power receiving unit disclosed in FIGS. 1 to 12. Accordingly, the operation of the wireless power receiver in this embodiment is implemented by one or a combination of two or more of each component of the wireless power receiver in FIGS. 1 to 12. For example, in the present embodiment, transmission/reception of data, packets, messages, etc. may be performed by the communication/control circuit 220, the in-band communication module 221, or the out-band communication module 222. In addition, entry into the suspend state, operation in the suspend state, termination of the suspend state, and the like may be controlled by the communication/control circuit 220.

The wireless power transmission apparatus in the embodiment according to FIGS. 13 to 17 corresponds to the wireless power transmission apparatus or the wireless power transmitter or the power transmission unit disclosed in FIGS. 1 to 12. Accordingly, the operation of the wireless power transmitter in this embodiment is implemented by one or a combination of two or more of each component of the wireless power transmitter in FIGS. 1 to 12. For example, in this embodiment, transmission/reception of data, packets, messages, etc. may be performed by the communication/control circuit 120, the in-band communication module 121 or the out-band communication module 122. In addition, operations in the suspend state may be controlled by the communication/control circuit 120.

Meanwhile, authentication between the wireless power transmitter and the wireless power receiver will be described below.

Figure 18:
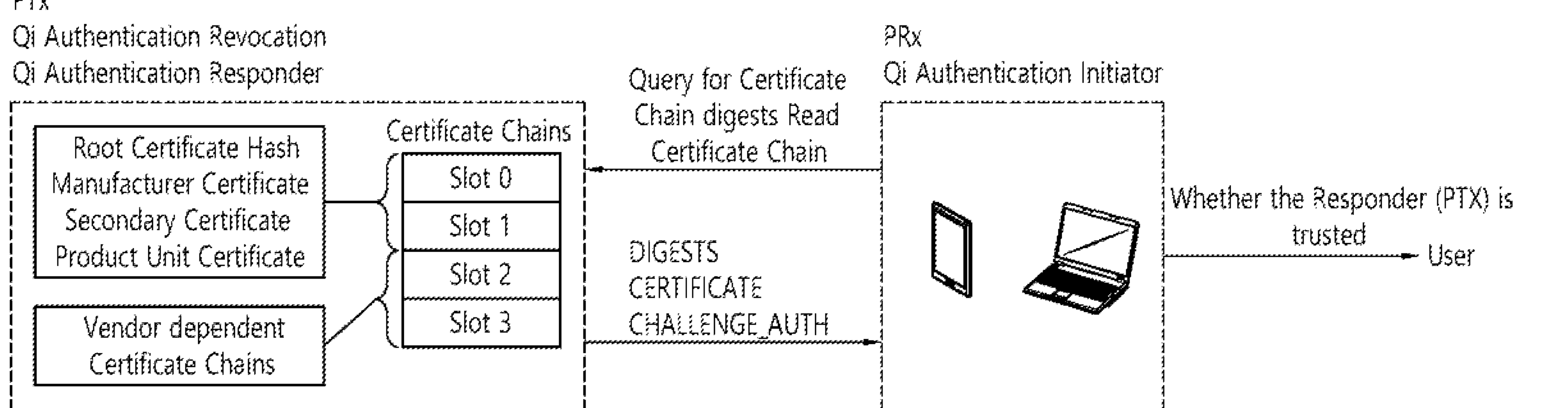
FIG. 18 is a diagram for explaining Qi authentication between a wireless power transmitter and a wireless power receiver according to an embodiment.

FIG. 18 is a diagram for explaining Qi authentication between a wireless power transmitter and a wireless power receiver according to an embodiment.

Referring to FIG. 18, in Qi authentication, the wireless power receiver may operate as an authentication initiator, and the wireless power transmitter may operate as an authentication responder.

The wireless power transmitter may place the certificate chain in four slots (Slot 0, Slot 1, Slot 2, Slot 3). Root Certificate Hash, Manufacturer Certificate, Secondary Certificate, and Product Unit Certificate are included in Slot 0 and Slot 1, and additional certificate chains (Vendor dependent Certificate Chains) may be included in Slot 2 and Slot 3.

The wireless power receiver transmits a message (e.g., GET_CERTIFICATE) requesting a certificate chain to the wireless power transmitter to authenticate the wireless power transmitter. The wireless power transmitter that has received the message requesting the certificate chain transmits the certificate chain to the wireless power receiver. The wireless power receiver that has received the certificate chain checks whether the certificate chain is validly signed, if the certificate chain is validly signed, a CHALLENGE message is transmitted to the wireless power transmitter. The wireless power transmitter that has received the CHALLENGE message transmits the CHALLENGE_AUTH message to the wireless power receiver. The wireless power receiver that has received the CHALLENGE_AUTH message determines the validity of the certificate signature based on this, if the certificate signature is valid, it is determined that the wireless power transmitter is authenticated. The wireless power receiver may provide a result of whether the wireless power receiver is authenticated to the user through the UI.

In the case of authentication of a wireless power transmitter that has already been trusted before, the wireless power receiver that caches the digests and public key of the wireless power transmitter transmits a digest request message (e.g., GET_DIGESTS) to the wireless power transmitter. The wireless power transmitter that has received the digest request message transmits a DIGESTS message including information on the digest of the certificate chain to the wireless power receiver. The wireless power receiver that has received the DIGESTS message determines whether the received digest is cached, if the digest is cached, the process of requesting a certificate chain from the wireless power transmitter and receiving it is omitted, the CHALLENGE message is transmitted to the wireless power transmitter. If the digest is not cached, the wireless power receiver transmits a message (e.g., GET_CERTIFICATE) requesting a certificate chain.

Figure 19:
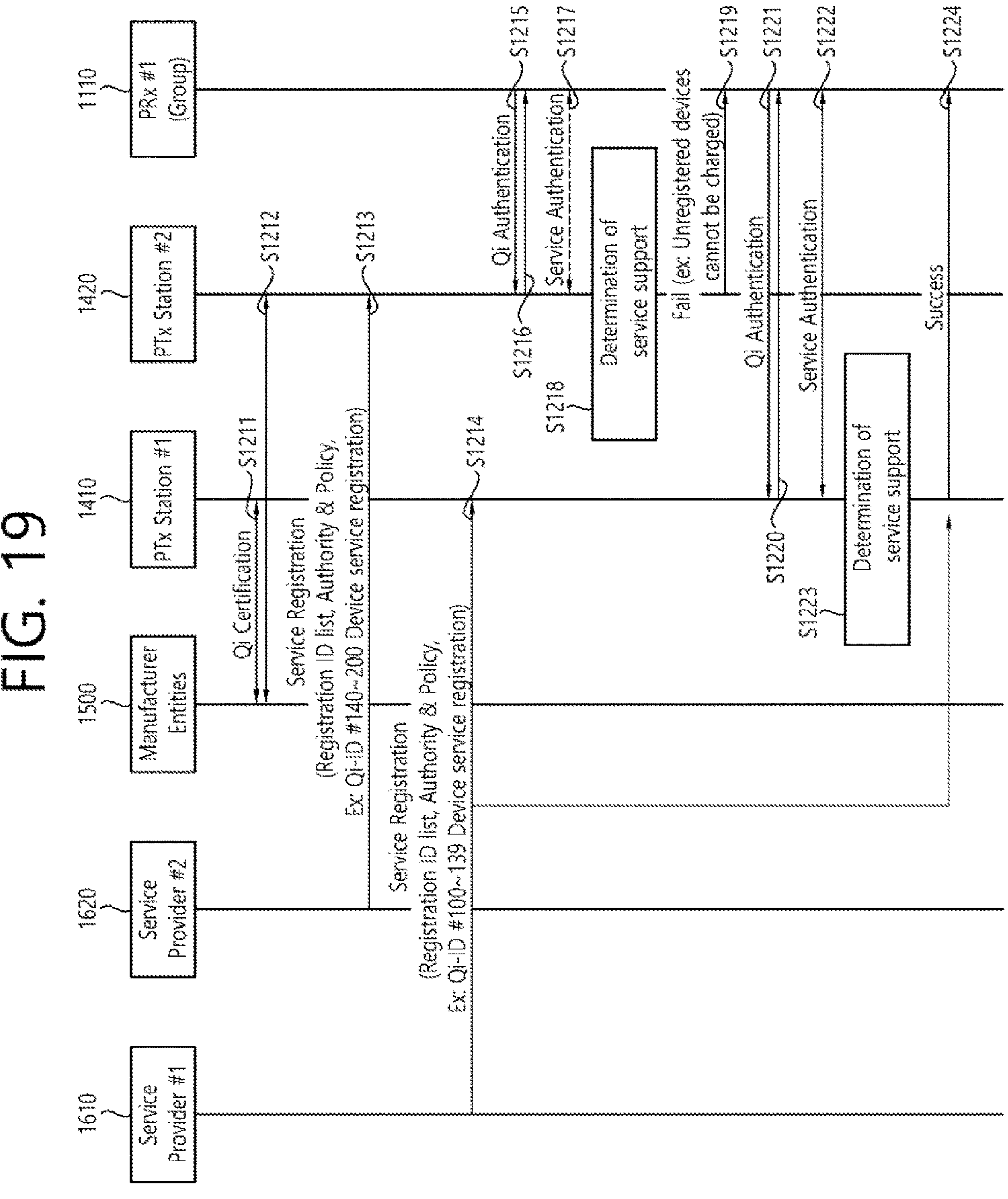
FIG. 19 is a flowchart illustrating a method of providing a wireless charging service according to an embodiment.

Meanwhile, FIG. 19 is a flowchart illustrating a method of providing a wireless charging service according to an embodiment.

A method of providing a wireless charging service according to an embodiment to be described with reference to FIG. 19 relates to a method of selectively providing a charging service according to a wireless power receiver.

Referring to FIG. 19, the manufacturer (Manufacturer Entities, 1500) provides Qi authentication to the first wireless power transmitter 1410 and the second wireless power transmitter 1420, respectively (S1211 and S1212). The manufacturer 1500 may be a manufacturer of the first wireless power transmitter 1410 and the second wireless power transmitter 1420. The manufacturers of the first wireless power transmitter 1410 and the second wireless power transmitter 1420 may be different companies.

The first service provider 1610 provides a wireless charging service using the first wireless power transmitter 1410, the second service provider 1620 may provide a wireless charging service using the second wireless power transmitter 1420. The first service provider 1610 is an institution that has installed the first wireless power transmitter 1410 to provide a wireless charging service, or the first service provider 1610 is an institution that has obtained an authority to provide a wireless charging service using the first wireless power transmitter 1410 through a contract with an institution that has installed the first wireless power transmitter 1410, etc. The second service provider 1620 is an institution that has installed the second wireless power transmitter 1420 to provide a wireless charging service, or the second service provider 1620 is an institution that has obtained the right to provide a wireless charging service using the second wireless power transmitter 1420 through a contract with an institution that has installed the second wireless power transmitter 1420.

The second service provider 1620 provides service registration to the second wireless power transmitter 1420 that provides a wireless charging service (S1213), and the first service provider 1610 provides service registration to the first wireless power transmitter 1410 that provides a wireless charging service (S1214).

Service registration may include registration of the ID of the wireless power receiver to be provided with the charging service in each wireless power transmitter 1410 and 1420 and/or registration of information about service authentication and authentication policy with each wireless power transmitter 1410 and 1420.

For example, the first service provider 1610 may provide the ID of the first wireless power receiver 1110 capable of receiving the wireless charging service by the first service provider 1610 to the first wireless power receiver 1110. When the first wireless power receiver 1110 is a plurality of wireless power receivers composed of at least one group, IDs #100 to 139 of each of the plurality of wireless power receivers may be provided to the first wireless power receiver 1110.

The ID of the service target wireless power receiver provided to the wireless power transmitters 1410 and 1420 may be a Qi-ID included in a certificate for Qi authentication (hereinafter, a first authentication method). In this case, the wireless power transmitters 1410 and 1420 may determine whether the wireless power receiver is a service target in the Qi authentication process based on the Qi-ID, and determine whether to provide a charging service based on this.

Alternatively, the ID of the service target wireless power receiver provided to the wireless power transmitters 1410 and 1420 may be a separate service ID separate from the Qi-ID (hereinafter, the second authentication method). In this case, the wireless power transmitters 1410 and 1420 may determine whether the wireless power receiver is a service target through a Qi authentication process or a separate service ID confirmation process, and determine whether to provide a charging service based on this.

Alternatively, the wireless power transmitters 1410 and 1420 do not hold a list such as IDs of the service target wireless power receivers, the wireless power transmitters 1410 and 1420 determine whether the wireless power receiver is a service target using additional certificate chains included in Slot 2 and Slot 3, based on this, it may be determined whether to provide a charging service (hereinafter, a third authentication method).

Referring back to FIG. 19, in order for the first wireless power receiver 1110 to receive wireless charging from the second wireless power transmitter 1420, Qi authentication may be performed between the first wireless power receiver 1110 and the second wireless power transmitter 1420 (S1215 and S1216). The first wireless power receiver 1110 is a device that cannot receive a wireless charging service from the second wireless power transmitter 1420.

The second wireless power transmitter 1420 determines whether to support the wireless charging service for the first wireless power receiver 1110 (S1218).

According to the first authentication method and the third authentication method, the second wireless power transmitter 1420 may confirm that the first wireless power receiver 1110 is not a service target in the Qi authentication process. The second wireless power transmitter 1420 confirming that the first wireless power receiver 1110 is not a service target does not provide a wireless charging service to the first wireless power receiver 1110. The second wireless power transmitter 1420 may transmit a message notifying that authentication has failed to the first wireless power receiver 1110 (S1219).

According to the second authentication method, the first wireless power receiver 1110 and the second wireless power transmitter 1420 perform Qi authentication (S1215, S1216), the second wireless power transmitter 1420 performs a service authentication procedure for the first wireless power receiver 1110 (S1217), according to the result of the service authentication procedure, the second wireless power transmitter 1420 determines whether to support the wireless charging service for the first wireless power receiver 1110 (S1218). Since the first wireless power receiver 1110 does not have a service ID for receiving the wireless charging service from the second wireless power transmitter 1420, the second wireless power transmitter 1420 does not provide a wireless charging service to the first wireless power receiver 1110. The second wireless power transmitter 1420 may transmit a message notifying that the service authentication has failed to the first wireless power receiver 1110 (S1219).

Referring back to FIG. 19, in order for the first wireless power receiver 1110 to receive wireless charging from the first wireless power transmitter 1410, Qi authentication may be performed between the first wireless power receiver 1110 and the first wireless power transmitter 1410 (S1220 and S1221). The first wireless power receiver 1110 is a device capable of receiving a wireless charging service from the first wireless power transmitter 1410.

The first wireless power transmitter 1410 determines whether to support the wireless charging service for the first wireless power receiver 1110 (S1223).

According to the first authentication method and the third authentication method, the first wireless power transmitter 1410 may confirm that the first wireless power receiver 1110 is a service target in the Qi authentication process. The first wireless power transmitter 1410 confirming that the first wireless power receiver 1110 is a service target provides a wireless charging service to the first wireless power receiver 1110. The first wireless power transmitter 1410 may transmit a message notifying that authentication has been successful to the first wireless power receiver 1110 (S1224).

According to the second authentication method, the first wireless power receiver 1110 and the first wireless power transmitter 1410 perform Qi authentication (S1220, S1221), the first wireless power transmitter 1410 performs a service authentication procedure for the first wireless power receiver 1110 (S1223), according to the result of the service authentication procedure, the first wireless power transmitter 1410 determines whether to support the wireless charging service for the first wireless power receiver 1110 (S1223). Since the first wireless power receiver 1110 has a service ID for receiving a wireless charging service from the first wireless power transmitter 1410, the first wireless power transmitter 1410 provides a wireless charging service to the first wireless power receiver 1110. The first wireless power transmitter 1410 may transmit a message notifying that service authentication has failed to the first wireless power receiver 1110 (S1224).

As described above, according to the method for providing a wireless charging service according to an embodiment, a service provider providing a wireless charging service may selectively provide a charging service according to a wireless power receiver.

The wireless power receiver in the embodiment according to FIGS. 18 to 19 corresponds to the wireless power receiving apparatus or the wireless power receiver or the power receiving unit disclosed in FIGS. 1 to 17. Accordingly, the operation of the wireless power receiver in this embodiment is implemented by one or a combination of two or more of the respective components of the wireless power receiver in FIGS. 1 to 17. For example, in the present embodiment, transmission/reception of data, packets, messages, etc. may be performed by the communication/control circuit 220, the in-band communication module 221, or the out-band communication module 222. In addition, Qi authentication with the wireless power transmitter, service authentication, etc. may be controlled by the communication/control circuit 220.

The wireless power transmission apparatus in the embodiment according to FIGS. 18 to 19 corresponds to the wireless power transmission apparatus or the wireless power transmitter or the power transmission unit disclosed in FIGS. 1 to 17. Accordingly, the operation of the wireless power transmitter in this embodiment is implemented by one or a combination of two or more of each component of the wireless power transmitter in FIGS. 1 to 17. For example, in this embodiment, transmission/reception of data, packets, messages, etc. may be performed by the communication/control circuit 120, the in-band communication module 121 or the out-band communication module 122. In addition, Qi authentication and service authentication with the wireless power receiver may be controlled by the communication/control circuit 120.

Since all components or steps are not essential for the wireless power transmission method and apparatus, or the reception apparatus and method according to the embodiment of the present specification described above, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each component or step described above does not necessarily have to be performed in the order described, it is also possible that the steps described later are performed prior to the steps described earlier.

The above description is merely illustrative of the technical spirit of the present specification, and various modifications and variations will be possible without departing from the essential characteristics of the present specification by those skilled in the art to which this specification belongs. Accordingly, the embodiments of the present specification described above may be implemented separately or in combination with each other.

Therefore, the embodiments disclosed in the present specification are for explanation rather than limiting the technical idea according to the present specification, and the scope of the technical idea according to the present specification is not limited by these embodiments. The protection scope of the present document should be construed by the following claims, and all technical ideas within the scope equivalent thereto should be construed as being included in the scope of the present document.

What is claimed is:

1. A wireless power receiver, which receives a wireless power from a wireless power transmitter and is capable of receiving an additional power from an additional power source in addition to the wireless power, configured to:

during receiving the wireless power from the wireless power transmitter according to a power transfer contract established with the wireless power transmitter, enter a suspend state for receiving the wireless power transmitted according to the power transfer contract during a predetermined time based on a change in the additional power, wherein, after entering the suspend state, the wireless power receiver transmits, to the wireless power transmitter, update information for updating the power transfer contract during the predetermined time, and wherein, in a case of transmitting the update information to the wireless power transmitter through out-band communication using a frequency other than an operating frequency, the predetermined time is set shorter compared to a case of transmitting the update information to the wireless power transmitter through in-band communication using the operating frequency for receiving the wireless power.

2. The wireless power receiver of claim 1, wherein, after entering the suspend state, the wireless power receiver transmits, to the wireless power transmitter, a message notifying a change in the additional power or a change in a load state due to a change in the additional power.

3. The wireless power receiver of claim 1, wherein the change in the additional power is that a reception of the additional power is stopped during receiving the wireless power or the additional power is received while the wireless power is received.

4. The wireless power receiver of claim 3, wherein the additional power is a power supplied through at least one of a power cable and a battery.

5. A method for receiving a wireless power from a wireless power transmitter, the method performed by a wireless power receiver which is capable of receiving an additional power from an additional power source in addition to the wireless power and comprising:

receiving, from the wireless power transmitter, the wireless power according to a power transfer contract established with the wireless power transmitter; and entering a suspend state for receiving the wireless power transmitted according to the power transfer contract during a predetermined time based on a change in the additional power, wherein, after entering the suspend state, the wireless power receiver transmits, to the wireless power transmitter, update information for updating the power transfer contract during the predetermined time, and wherein, in a case of transmitting the update information to the wireless power transmitter through out-band communication using a frequency other than an operating frequency, the predetermined time is set shorter compared to a case of transmitting the update information to the wireless power transmitter through in-band communication using the operating frequency for receiving the wireless power.

6. The method of claim 5, wherein, after entering the suspend state, the wireless power receiver transmits, to the wireless power transmitter, a message notifying a change in the additional power or a change in a load state due to a change in the additional power.

7. The method of claim 5, wherein the change in the additional power is that a reception of the additional power is stopped during receiving the wireless power or the additional power is received while the wireless power is received.

8. The method of claim 7, wherein the additional power is a power supplied through at least one of a power cable and a battery.

* * * * *